United States Patent [19]

Park et al.

[11] Patent Number: 5,756,626

[45] Date of Patent: May 26, 1998

[54] VINYL CHLORIDE COPOLYMERS WITH MONOALLYL ETHERS OF POLYHYDRIC ALCOHOLS

[75] Inventors: Hung S. Park, Avon Lake; David A. Strickler; Anthony A. Parker, both of Toledo, all of Ohio

[73] Assignee: Libbey-Owens-Ford Co., Toledo, Ohio

[21] Appl. No.: 695,208

[22] Filed: Aug. 7, 1996

Related U.S. Application Data

[63] Continuation-in-part of Ser. No. 448,628, May 23, 1995, abandoned.

[51] Int. Cl.[6] .................................................. C08F 116/18
[52] U.S. Cl. .................................... 526/333; 526/238.23
[58] Field of Search ........................... 526/238.23, 333, 526/332

[56] References Cited

U.S. PATENT DOCUMENTS 3,705,883  12/1972  Wingler ................................. 526/333

Primary Examiner—Christopher Henderson
Attorney, Agent, or Firm—Marshall & Melhorn

[57] ABSTRACT

A process for polymerizing vinyl chloride alone or a mixture of vinyl chloride and other vinyl monomer(s) with hydroxy containing monomer(s), and the copolymer obtained thereby. The hydroxy containing monomer(s) is obtained by the partial allylation of dihydroxy or polyhydroxy alcohols. The copolymers are prepared by suspension polymerization. The presence of the hydroxyl groups significantly modifies the characteristics of the polymers. Plasticizer-take-up is increased and dry-time is reduced significantly. Furthermore, the hydroxyl groups become the sites for postpolymerization reactions due to their polarity and reactivity.

7 Claims, No Drawings

VINYL CHLORIDE COPOLYMERS WITH MONOALLYL ETHERS OF POLYHYDRIC ALCOHOLS

This application is a continuation-in-part of U.S. Ser. No. 08/448,628 filed May 23, 1995 now abandoned.

BACKGROUND OF THE INVENTION

1. Field of the Invention

This invention relates to a process for polymerizing vinyl chloride alone or a mixture of vinyl chloride and other vinyl monomer(s) with one or more hydroxy containing monomers, and the vinyl chloride copolymers obtained thereby. More particularly, the invention relates to a suspension polymerization process for polymerizing vinyl chloride with a hydroxy containing monomer obtained by the partial allylation of dihydroxy or polyhydroxy alcohols.

2. Summary of Related Art

Vinyl chloride homopolymers have been widely employed in numerous industrial applications for many years. Not surprisingly, there have been numerous attempts to improve the physical properties of these polymers. For example, early attempts to modify the characteristics of polyvinyl chloride resins were made by Nelson, et al., as is disclosed in U.S. Pat. No. 3,706,722. Nelson et al. describe a process, known as a phase inversion process, for polymerizing polyvinyl chloride resin. Unlike a typical suspension polymerization, the monomer is in the continuous phase up to approximately 10% conversion. Thereafter, additional water is metered into the reactor to make the water be the continuous phase and the monomer the discontinuous phase.

This phase inversion process is the combination of mass polymerization in the early stage of polymerization and the subsequent inversion to suspension polymerization. The shortcomings of this technology are the complexity of the operation and the heavy polymer build-up on the internal surfaces of the polymerization equipment. Overall shapes of the polymer particles are not spherical, which makes the funnel flow time very long. In other words, the processing of the polymer takes a relatively long time. While the polyvinyl chloride resins obtained thereby show improvement in porosity, they do not have any functional groups permitting wide versatility in applications of the polymer.

U.S. Pat. No. 4,755,539 discloses an alternative method for modifying the surfaces of polyvinyl chloride resin particulates. The polymerization depends on the specific choice of an ion sensitive water-soluble dispersant. The charging procedure is described as follows:

(a) charge water and ion sensitive primary dispersant.

(b) agitate the water and primary dispersant until an emulsion is formed.

(c) stop the agitation.

(d) charge the monomer(s).

(e) charge a solution comprising a solvent and catalyst and optionally the secondary dispersant.

(f) allow the time for the catalyst to be diffused through the monomer layer.

(g) start the agitation.

(h) conduct the polymerization until 1 or 2% conversion is reached. Then add NaOH to desorb the primary dispersant from the monomer droplet.

(i) continue the polymerization to the point of the desired degree of polymerization.

The shortcomings of this technology are the quite delicate operation to desorb the primary dispersant and the dependence on single choice of primary dispersant. This technique specifically excludes high hydrolysis polyvinyl alcohol greater than 70% and methyl cellulose as a primary dispersant because of the formation of skins on the surfaces of the resin particulates. The morphology of the polymer is non-spherical, which will restrict the areas of the product applications. Also, the resins do not have any functional groups, which will limit the versatility of the applications further.

Functional groups have been incorporated into polyvinyl chloride resins, typically to make good protective coating materials. Those functional groups improve abrasion resistance and impart flexibility to the resins. The coating materials are prepared by dissolving the polymers into ketone or ester solvents. Mainly, two functional groups are utilized. They are carboxyl and hydroxyl groups.

U.S. Pat. No. 2,147,154 discloses a method for polymerizing vinyl chloride with acrylic acid in emulsion. The products include 0.5 to 3% of acrylic acid.

One of the known methods of incorporating hydroxyl groups in polyvinyl chloride is through vinyl alcohol which is obtained from vinyl acetate with hydrolysis. Terpolymers of vinyl chloride, vinyl acetate, and vinyl alcohol are made by the steps:

(a) polymerize a mixture of vinyl chloride and vinyl acetate in acetone.

(b) separate and recover the resin from the resultant varnish as a completely dry, acetone free.

(c) redissolve the resin in a mixture of methanol and methyl acetate.

(d) hydrolyze the resin in the mixture.

(e) separate and recover the resultant terpolymer of vinyl chloride, vinyl acetate, and vinyl alcohol as well as the mixture of solvents.

This process several disadvantages: the high cost due to the double recovery of dry resin and solvent; the restricted amount of hydroxyl groups in the terpolymer because of the difficulty of making the copolymers having vinyl acetate content higher than 15%; the environmental concern and cost out of the usage of hydrocarbon solvents; the limitations in molecular weight as is typified by solution polymerizations; and the difficulty in obtaining controlled particle size and porosity via precipitation from solution.

U.S. Pat. No. 2,852,499 describes a method which reduced the cost disadvantage somewhat. This method uses solvent mixtures such a methoxyethanol, ethoxyethanol, methoxyethyl acetate, and dioxane. Both the polymerization of vinyl chloride with vinyl acetate and the subsequent hydrolysis were conducted in the same solvent. This process is still beset with the fundamental problems of hydrocarbon solvent usage, and separation and recovery of the resin as well as the solvent.

Vinyl chloride has also been copolymerized with allyl alcohol and dibutyl fumarate, as disclosed in U.S. Pat. No. 3,036,029. The mixture of allyl alcohol, vinyl chloride, and dibutyl fumarate was polymerized at 120° F. in the absence of any solvent. The end product of this bulk or mass type polymerization was a clear colorless syrup comprising terpolymer dissolved in unreacted monomers. This process also faces the difficulty and cost of separation and recovery of monomers and the resin.

U.S. Pat. No. 3,257,360 illustrates a technique for copolymerizing vinyl chloride with vinyloxyethanol and fumaric ester. The monomer mixtures of vinyl chloride, vinyloxyethanol, and dibutyl fumarate were polymerized at 60° C. with azobisisobutylnitrile without any solvent. The polymerization products were put into petroleum ether, where the vinyl chloride-vinyloxyethanol-dibutyl fumarate terpolymers precipitate immediately. This process also can not avoid the usage of hydrocarbon solvents, and it limits the polymerization to low molecular weight polymer.

Resins of polyvinyl chloride have also been made to contain hydroxyl groups by emulsion polymerization with hydroxyl alkyl acrylates. U.S. Pat. No. 2,686,172 illustrates the polymerization of vinyl chloride, alkyl acrylates, and hydroxy alkyl acrylates.

Recently, different approaches have been taken to modify polyvinyl chloride. Vinyl chloride copolymers have been used as a binder with a magnetic powder for a magnetic recording medium, as disclosed in U.S. Pat. No. 4,983,311 and U.S. Pat. No. 5,064,730.

U.S. Pat. No. 4,983,311 describes a vinyl chloride copolymer in which two functional groups, hydroxyl group and carboxylic acid group are simultaneously incorporated into the polymer binder via a homogeneous solution polymerization process. In Example 1 of this patent, the following recipe, all in parts by weight, was used:

| batch charge - | vinyl chloride | 100 |
| | glycerin monoallyl ether | 3 |
| | acetone | 180 |
| | benzoyl peroxide | 2 |
| metering - | maleic anhydride | 3 |
| | vinylidene chloride | 10 |
| | methanol | 40 |

Thus, this is not a typical suspension polymerization. Suspension polymerization makes use of a single solvent, water, as the continuous phase with monomer droplets suspended therein to form a non-homogeneous mixture. If other solvents are used, they are in minor portion and the mixture remains heterogeneous. In the invention described in U.S. Pat. No. 4,983,311, a mixture of solvents, such a acetone and methanol or water and methanol, is used in an almost 50/50 ratio. Also, the use of 2% catalyst with respect to monomers is unusually high, and can limit the polymerization to lower molecular weights. The usage level of catalyst in a suspension polymerization is generally 0.01 to 0.5 at most per 100 parts by weight of monomer(s). The dependence on the solvents poses environmental problems and increases manufacturing cost.

U.S. Pat. No. 5,064,730 discloses an approach quite similar to that in U.S. Pat. No. 4,983,311. A vinyl chloride copolymer containing hydroxyl groups as well as quaternary ammonium salt was chosen to be a binder to make magnetic recording medium. The recipe of Example 1 in the patent is as follows:

| batch charge - | water | 120 |
| | methylcellulose | 0.6 |
| | sodium laurylsulfate | 0.2 |
| | lauroyl peroxide | 1.2 |
| | vinyl chloride | 100 |
| | vinyl acetate | 8 |
| | allyl 2-hydroxyethyl fiber | 5 |
| | diallyldimethylammonium chloride | 3 |
| | methanol | 120 |

Thus, in U.S. Pat. No. 5,064,730, a mixture of solvents such as water and methanol is also used. Once again, the usage level of catalysts and dispersants are unusually high compared with a typical suspension polymerization. Furthermore, two functional groups, namely hydroxyl group and quaternary ammonium salt are simultaneously incorporated into the polymer.

Approximately 80% of polyvinyl chloride resins are produced by suspension polymerization. The remaining 20% are produced by emulsion polymerization including the other methods such as solution polymerization and inversion polymerization. In spite of the latent commercial importance of doing so, hydroxyl groups have not been incorporated into polyvinyl chloride resins by suspension polymerization. Environmental concern alone may exclude the polymerization in hydrocarbon solvents. The presence of hydroxyl groups in the resins would allow greater versatility of the resins applications to the end products because of the polarity and reactivity of the hydroxyl groups.

The polyvinyl chloride particulates also need to have voids open to their surfaces. Voids which are sealed off at the surfaces are not useful, as they do not add to porosity. High porosity in the particulates permits faster removal of vinyl chloride monomer from the particulates at the stripping stage of the process, and a larger absorption of plasticizers, properties important in the subsequent commercial use of the resin. Up to the present, polyvinyl chloride resins have not been produced having high porosity and reactive hydroxyl groups available for postpolymerization reactions.

SUMMARY OF THE INVENTION

This invention discloses a method of incorporating hydroxy functional groups into polyvinyl chloride resins by suspension polymerization and the vinyl chloride copolymers obtained thereby. Hydroxy functional groups are brought into the polymers with hydroxy containing monomers, which are synthesized by the partial allylation of dihydroxy or polyhydroxy alcohols. Neither solution, subsequent hydrolysis, nor emulsion processes are involved. Surprisingly, the presence of the hydroxyl groups greatly enhances the porosity of the resins and reduces the dry-time for plasticizer up-take significantly. Apparently, the hydroxyl groups modify the surface morphology of the polymer particles through the course of the polymerization to yield resins that contain a higher amount of porosity. This is very important since porosity determines both the rate of removal of the residual monomer from the resins at the processing step of stripping and drying, and the final quantities of the plasticizer to be adsorbed by the resin. Dry-time is another important property which decides the rate of plasticizer absorption by the resins.

The presence of hydroxyl groups in the resins also permits wider flexibility in the applications of the resins due to their polarity and reactivity. The hydroxyl groups can be utilized for postpolymerization reactions, such as reaction with hydrogen halides and ester formation. Specifically, they can provide better adhesion to surfaces, especially metal and glass, and easier dyeability, to the polymer. The compatibility of the resins with other plastics can be improved by taking advantage of the hydroxyl groups.

The resins obtained in accordance with this invention may be advantageously used in a wide variety of applications. One especially advantageous use of the these resins is in forming the interlayer of laminated safety glazings, such as vehicle windshields and architectural glazings.

DESCRIPTION OF THE EMBODIMENT

The present invention relates to a process for the production of vinyl chloride polymers by suspension polymerization, resulting in a free flowing powder with an average particle size in the range of about 50 to about 200 microns. The ultimate particulates are formed of a large number of much smaller particles. Using the terminology proposed by Faulkner, P. G. in J. Macromol. Sci-Phys., B11 (2), (1975) pp. 251-279, the particles initially formed during the polymerization are termed the Stage 1 particles. Those initial particles agglomerate into small intermediate sizes of approximately 1 micron in diameter, called Stage II particles. Subsequent agglomeration of the Stage II particles form the final complete grains of the resins, which are referred to as Stage III particles. The Stage III particles consist of Stage II particles partially fused together to form a three dimensional lattice, thus giving the Stage III particles strength and rigidity.

The manner in which the particles grow from submicrons sizes to 100 microns in suspension will determine the nature of the porosity. In other words, the manner of the agglomeration of Stage I particles to Stage III particles will determine how the Stage III particles maintain the open passages among the Stage I and Stage II particles. If only hydrophobic monomers such as vinyl chloride are polymerized, the very nature of the hydrophobicity of the monomers and the subsequent polymers will squeeze out the water from the agglomerates to a great extent. This will increase the chance that the agglomerates will fuse, reducing the porosity of the final product.

If other monomers having hydroxyl groups are copolymerized with the vinyl chloride monomer, the hydrophobic nature of the resulting polymer will be modified to be partially hydrophilic. As the particles grow in size from submicrons to 100 microns, the water will tend to stay within the agglomerates. In particular, the hydrogen bonds formed between the hydroxyl groups and the water molecules will retain the water due to the difficulty in breaking these bonds. Water molecules will thus be among the Stage I particles, Stage II particles, and Stage I and Stage II particles. This will limit the degree of fusion, and contribute to the opening of the passages from the inner core of the agglomerates to the surfaces of the Stage III particles. As a result, the porosity will be increased significantly, plasticizer-take-up of the polymer will be enhanced, and the drying-time will be reduced.

Hydroxy Containing Monomers(s)

The selection of the hydroxy containing monomer(s) is very important. Consideration must be given to the structure of the monomer(s). The hydroxyl groups preferably ought to be placed to be accessible for postpolymerization reactions, and to be kept at a distance from the polymer backbone chain to avoid steric hindrance. It has been found that those two qualities are met by selecting the monomer(s) containing the hydroxyl groups from the allyl ethers of polyhydric alcohols.

Generally, these allyl ethers are prepared by the Williamson synthesis, reacting an alcohol with allyl chloride in a caustic medium. Complete allylation of the polyhydric alcohol is to be avoided, since this would eliminate the hydroxyl groups. On the other hand, only partial allylation of the polyhydric alcohol will allow the existence of hydroxyl groups. The reactions are shown schematically in the following two equations:

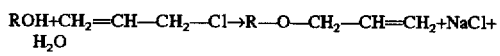

ROH+CH$_2$=CH—CH$_2$—Cl→R—O—CH$_2$—CH=CH$_2$+NaCl+ H$_2$O

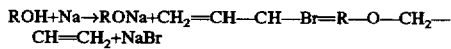

ROH+Na→RONa+CH$_2$=CH—CH—Br=R—O—CH$_2$—CH=CH$_2$+NaBr

Dihydroxy and polyhydroxy alcohols are suitable for the purpose of this invention. Examples of dihydroxy alcohols include ethylene glycol, diethylene glycol, triethylene glycol, propylene glycol, dipropylene glycol, propanediol, butanediol, pentanediol, etc. Examples of polyhydroxy alcohols include glycerol, trimethylolethane, trimethylolpropane, pentaerythritol, sorbitol, sugar, starch, etc.

Examples of hydroxy containing monomers synthesized by the partial allylation of such polyhydric alcohols include trimethylolpropane diallyl ether, trimethylolpropane monoallyl ether, allyl sucrose, allyl pentaerythritol, glycerol monoallyl ether, glycerol diallyl ether, etc. The preferred hydroxy containing monomers are trimethylolpropane monoallyl ether and trimethylolpropane diallyl ether.

The allyl ethers prepared by the partial allylation of a polyhydric alcohols are preferably used in accordance with the invention in the range of 0.015 to 30, and more preferably in the range of about 0.1 to 10, parts by weight per hundred parts by weight of the total monomer mixture.

Monomer

In addition to hydroxy containing monomers, the monomer to be used in the process of this invention is vinyl chloride.

Solvent

In suspension polymerization, the solvent is usually deionized water. In solution polymerization, the polymerization is generally conducted in hydrocarbon solvents. Mass polymerization does not use any solvent. Even in suspension polymerization, a minor amount of hydrocarbon solvent such as hexane or methanol is added to the deionized water in order to facilitate homogeneous dispersion of the catalysts. Judicious choice of a mixture of solvents produces different solubility parameters which will advantageously affect the distribution or reactivity of monomers. Yet, the consideration of environmental concerns and the increased manufacturing costs generally exclude the use solvents other than water in suspension polymerization. The usage level of the deionized water is preferably equal to or higher than 100 parts by weight of monomer(s).

Initiator

In accordance with the process of this invention, initiators are used which are miscible with hydrocarbon solvents. Examples of those initiators include diacyl peroxides such as lauroyl peroxide, benzoyl peroxide, etc; peroxydicarbonates such as di(2-ethylhexyl) peroxydicarbonate, di(sec-butyl) peroxydicarbonate, etc; peroxyesters such as 1,1-dimethyl-3-hydroxybutyl peroxyneoheptanoate, t-butyl peroxyneodecanoate, t-butyl peroxypivalate, etc; peroxides such as acethylcyclohexylsulfonyl peroxide, 3,5,5-trimethylhexanoyl peroxide, etc; azo compounds such as azobis-2, 4-dimethyl valero nitrile, azobis (4-methoxy-2, 4-dimethylvaleronitrile), etc; and so on. As an option, initiators miscible with water may be used as well.

The initiators may be used singly or in combination of two or more to keep the level of free radicals steady throughout the polymerization. Generally, the initiator or initiator mixture is used in an amount of 0.01 to 0.5 parts by weight per 100 parts by weight of the monomer(s). In the case of a fast polymerization, or where lower molecular weight polymer is desired, initiators in an amount higher than 0.10 parts by weight per 100 parts by weight of the monomer(s) may be used.

Dispersant

This invention does not impose any restriction on the choice of dispersants. Any dispersant used in the trade is usable. Examples of dispersants include water-soluble cellulose esters such as hydroxypropylmethyl cellulose, hydroxyethyl cellulose, etc; water-soluble polymers such as partially saponified polyvinyl alcohols, polyacrylic acid, gelatin, and so on. These dispersants are frequently used in combination of two or more to enhance the stability of the suspension droplets formed by agitation. The preferred level of the dispersant(s) is about 0.03 to 0.5 parts by weight per 100 parts by weight of the monomer(s).

Other Additives

Other additives may added to the aforementioned ingredients for polymerization in accordance with this invention. Examples of such other additives include scale inhibitors such as nitric acid and oxalic acid, etc; defoamers such as dimethyl silicones, ethylene oxide-propylene oxide block polymers, etc; chain transfer agents such as trichloroethylene, butyl thioglycolate, etc; chelating agents such as diethylene triamine pentaacetic acid, nitrilotriacetic acid, etc; and so on. These additives can be added in any suitable amount, as is known by those skilled in the art.

Suspension Polymerization

The suspension polymerization in accordance with this invention can be carried out batchwise or semibatchwise. A semibatchwise process is typically used to achieve a homogenous composition of copolymers or terpolymers, when the reactivity ratios of the monomers are quite different. Predominantly, however, batch polymerization is utilized due to its simplicity and low cost operation. In a batch polymerization process, all of the ingredients are charged into a clean reactor at the outset. Then, the reactor is heated to a desired reaction temperature, preferably in the range 40° to 80° C., with adequate agitation. The duration of the polymerization varies depending on the desired degree of polymerization. It takes generally 3 hours to 12 hours. The polymerization is terminated with a proper kind of shortstopper, when the pressure in the reactor head space drops to a predetermined pressure. Thereafter, the slurries from the reactor are stripped with steam to remove residual monomers in the resins, and then dried, for example in a centrifuge.

Polymer

As illustrated by the examples below, the vinyl chloride polymers obtained by the method of this invention have an average particle diameter of 70 to 200 microns. The procedure used to determine the particle size distribution followed that described in ASTM A1921.

The plasticizer-take-up, which refers to the ability of the polymer to absorb a plasticizer through the pores in the polymer particles, was also measured. Such plasticizers provide cohesive forces for the polymer particles which enhance processability and end use properties when the polymer particles are extruded or molded into the desired end products, such as sheets, films, or tubing, for example. It is desirable to have the plasticizer be absorbed as quickly as possible or, conversely, to maximize the amount of plasticizer absorbed in a given time period. ASTM D1755-66 describes the procedure used to determine the plasticizer-take-up of the samples. The control resin, which has been prepared without hydroxyl containing monomers, had a plasticizer-take-up of 33%. The resins made by the method described in this invention showed a plasticizer-take-up in the range of 43% to 48%, a significant increase over the PVC homopolymer control resin.

The dry-time, which refers to the amount of time required to dry the polymer particles after the polymer particles have absorbed the plasticizers, was also measured for the samples of each of the examples below. The measurement of dry-time followed the procedure described in ASTM D2396. In order to provide a time which is useful for comparison, such dry-times are usually reported on the basis of the polymeric particles ability to absorb a fixed level of plasticizer, such as 52 parts of dioctyl phthalate (DOP). It is desirable for the polymeric particles to have a dry-time which is as low as possible. The control resin had a dry-time of 4.5 minutes. The resins made following this invention exhibited dry-times in the range of 1.0 to 3.5 minutes, significantly lower than that of the control resin.

The measurements of dry-time and plasticizer take-up are indicative of the relative porosity of a resin. Thus, the relative porosity, which refers to the volume of the pores open to the surfaces of the polymer particles, was also determined for the samples of each of the examples. The greater the volume of pores, the more sites that are available for plasticizer-take-up. This results in larger plasticizer-take-up and faster dry-time. As a result, a larger amount of plasticizer is absorbed in shorter time. This, in turn, lowers the fusion temperature of the polymer particle/plasticizer units, because the plasticizers typically have a lower processing temperature than the surrounding polymers. The major function of a plasticizer is to impart flexibility and workability to polyvinyl chloride particles. The plasticizers alter the glass transition and melting range of the polymers in solid state.

Broadly, two categories of plasticizers are commonly used. The first includes plasticizers such as DOP. The second type of plasticizers comprises polymeric plasticizer materials such as ditridecyl phthalate, and polyesters. The large size of the polymeric plasticizers makes them a preferred plasticizer for some applications, because they have less of a tendency to migrate from the inner cores of the polymeric particles after the polymer particles have been extruded or otherwise formed into their final shapes. Migration of the plasticizers causes the products made of the polymeric particles to become brittle. As mentioned above and illustrated by the examples below, the resins made by the method of this invention have high plasticizer-take-up with faster drying-time. These resins are therefore well suited for use with polymeric plasticizers.

The bulk density refers to the amount of polymeric material present in a given volume of a sample. The bulk density in the examples below was determined according to the procedure described in ASTM B1895. For general purpose applications of polyvinyl chloride resins, such as piping and building siding, a higher bulk density is usually preferred. The higher bulk density results in faster throughput when the polymeric material is extruded into a final shape, such as a sheet or tube. The control resin had the bulk density of 0.48 g/cc. The resins made by the method of this invention had bulk densities in the range of 0.42 to 0.45 g/cc as a result of their higher porosities.

Inherent viscosity characterizes the molecular weight of vinyl chloride polymer resins by determining the viscosity of a dilute solution thereof. The procedure used to determine the inherent viscosity in the examples below is described in ASTM D1243-66. The control resin had an inherent viscosity of 1.02. The resins made following the method of this invention had inherent viscosities in the range of 0.93 to 1.80.

EXAMPLES

The following examples are illustrative of the invention and do not constitute any limitation with regard to the subject matter of the invention.

The first example is the control, which is used as a bench mark to compare with the polymers made by the method of this invention. The only difference in the preparations between the control and the other polymers was the absence of hydroxy containing monomers in the control. The same process procedure was used in each case.

Example 1: (CONTROL)

| Recipe | Vinyl Chloride | 11,000 pounds |
|---|---|---|
| | Deionized Water | 16,000 pounds |
| | Catalyst Lup 10 | 1,600 mls |
| | Lup 688 | 1,600 mls |
| | Surfactant - Polyvinyl Alcohol | |
| | 72.5% Hydrolysis | 4.5 pounds |
| | 55% Hydrolysis | 10.0 pounds |
| | Defoamer | 2.0 pounds |
| | Chelating Agent | 2.0 pounds |

Note: Lup 10 is t-butyl peroxyneodecanoate; Lup 688 is 1,1-dimethyl-3-hydroxybutyl peroxyneoheptanoate Procedure:

(a) charge water, surfactant, and chelating agent into a clean 4,000 gallon reactor.

(b) start agitation.

(c) charge vinyl chloride.

(d) set the reactor controller to 128° F., and start heat up.

(e) when the reactor reaches 128° F., charge the catalysts.

(f) add the defoamer at four hours from the initiation of the polymerization.

(g) stop the polymerization at 10 psi pressure drop from the initial pressure at 128° F.

(h) strip the slurry for 10 minutes at 185° F. and cool down to 145° F.

(i) dry the stripped slurry.

(j) characterize the dried resin.

Example 2

To the recipe in Example 1, add 16.5 pounds of trimethylolpropane diallyl ether. Follow the same polymerization procedure described in Example 1, charging the trimethylolpropane diallyl ether in step (c) together with the vinyl chloride.

Example 3

Add 33 pounds of trimethylolpropane diallyl ether to the recipe in Example 1. Follow the same polymerization procedure described in Example 1, charging the trimethylolpropane diallyl ether in step (c) together with the vinyl chloride.

Example 4

Add 330 pounds of trimethylolpropane monoallyl ether to the recipe in Example 1. Follow the same polymerization procedure described in Example 1, charging the trimethylolpropane monoallyl ether in step (c) together with the vinyl chloride.

Example 5

Add 11 pounds of trimethylolpropane diallyl ether and 330 pounds of trimethylolpropane monoallyl ether to the recipe in Example 1. Follow the same polymerization procedure described in Example 1, charging both in step (c) together with the vinyl chloride.

The results for the above examples are compiled in Table 1 below.

TABLE 1

EXPERIMENTAL DATA

| | Control | Ex. 2 | EX. 3 | Ex. 4 | Ex. 5 |
|---|---|---|---|---|---|
| TMPMAE (PHM) | — | — | — | 3.0 | 3.0 |
| TMPDAE (PHM) | — | 0.15 | 0.30 | — | 0.10 |
| Inherent Viscosity | 1.02 | 1.25 | 1.80 | 0.93 | 1.15 |
| Bulk Density (g/cc) | 0.48 | 0.43 | 0.41 | 0.42 | 0.42 |
| Particle size Distribution (%) | | | | | |
| 40 mesh | trace | trace | trace | trace | 0.2 |
| 60 mesh | 2.0 | 0.8 | trace | trace | 0.2 |
| 80 mesh | 14.6 | 31.0 | 3.0 | 0.2 | 1.0 |
| 100 mesh | 11.4 | 29.6 | 18.3 | 0.8 | 2.0 |
| 140 mesh | 42.6 | 30.0 | 64.1 | 8.0 | 6.6 |
| 200 mesh | 23.8 | 8.6 | 11.0 | 30.2 | 34.7 |
| Pan | 5.6 | trace | 3.6 | 60.8 | 55.3 |
| Plasticizer-take-up (%) | 33.0 | 43.0 | 43.0 | 43.6 | 48.0 |
| Dry-time (minutes) | 4.5 | 3.2 | 1.0 | 2.3 | 2.4 |

Table 1 Note:
TMPDAE = trimethylolpropane diallyl ether
TMPMAE = trimethylolpropane monoallyl ether
PHM = parts by weight per 100 parts of monomer(s)
40 mesh is equivalent to 381 microns and 200 mesh is equivalent to 74 microns.

Example 6

In this example, the resin obtained in Example 4 was compounded into the formulation set forth below:

| Component | phr |
|---|---|
| Example 4 resin | 90 |
| Geon E-8[1] | 5 |
| Polycaprolactone | 5 |
| Dihexyl adipate | 40 |
| Drapex 6.8[2] | 5 |
| Thermchek 130[3] | 3 |
| Tinuvin 328[4] | 0.25 |
| Irganox 1010[5] | 0.5 |
| CPL-46[6] | 0.10 |

[1]Vinyl chloride/methylacrylate copolymer available from Geon, Inc. of Cleveland, Ohio.
[2]Epoxidized soybean oil available from Witco Corp. of Oakland, NJ.
[3]Barium/zinc stabilizer package available from Ferro Corp. of Walton Hills, OH.
[4]Benzatriazole ultraviolet light stabilizer available from Ciba-Geigy Corp.
[5]Hindered phenolic antioxidant available from Ciba-Geigy Corp. of Hawthorne, NY.
[6]Perchlorate stabilizer available from Asahi Denka Kogyo K. K. of Japan.

Laminates were formed from two sheets of soda-lime-silica glass, each 0.088" thick, and an interlayer of a 0.035" thick film of the above formulation. An adhesion promoter of a 4% solution of prehydrolyzed gamma mercapto propyl triethoxy silane in methanol was applied to the interface between the glass sheets and the film. The laminates were formed with an autoclave cycle including a 25 minute hold at 300° F. and 240 psi.

The laminates obtained had an initial yellowness index (YIC) of 1, as measured with a Spectrogard from Gardner/BYK of Silver Springs, Maryland. Some samples were placed in an oven at 100° C. for 480 hours, after which the YIC was determined to be 4.2. The interlayer adhesion to the glass was measured to be a pummel value of between 9 and 10. The laminates exhibited acceptable optics after a 25 minute hold in an autoclave at 147° C. The mean break height for the 12" by 12" laminates was measured to be 17 ft. at −18° C., 14 ft. at 32° C., and 8 ft. at 60° C. The transmitted percent haze was measured with a Hazegard XL200 from Gardner/BYK to be 0.5%.

In accordance with the provisions of the patent statutes, the invention has been described in what is considered to represent its preferred embodiment. However, it should be noted that the invention can be practiced otherwise than as specifically illustrated and described without departing from its spirit or scope.

What is claimed is:

1. A vinyl chloride copolymer prepared by the polymerization in the presence of a free radical initiator of a monomer mixture consisting of:
   (a) vinyl chloride; and
   (b) one or more mono allyl ethers in an amount of 0.15% by weight to 30% by weight of the total monomer mixture, each of said allyl ethers being prepared by the partial allylation of a polyhydric alcohol;
   the copolymer having a plasticizer take-up of about 43 to 48 grams of dioctyl phthalate (DOP) per 100 grams of copolymer, and having a dry-time of about 1 minute to 3.5 minutes.

2. A vinyl chloride copolymer as defined in claim 1, wherein said allyl ether is trimethylolpropane monoallyl ether.

3. A vinyl chloride copolymer as defined in claim 1, having an average particle size in the range of about 50 to about 200 microns.

4. A vinyl chloride copolymer as defined in claim 1, wherein vinyl chloride is about 90% or more by weight of the total monomer mixture, and said one or more allyl ethers is in the range of about 0.1 to 10% by weight of the total monomer mixture.

5. A vinyl chloride copolymer as defined in claim 1, wherein said monomer mixture consists of vinyl chloride and trimethylolpropane monoallyl ether.

6. A vinyl chloride copolymer as defined in claim 1, wherein said one or more allyl ethers are 0.015% by weight of the total monomer mixture.

7. A vinyl chloride copolymer as defined in claim 6, wherein said one or more allyl ethers are 0.1 by weight of the total monomer mixture.

* * * * *